July 17, 1962

H. TOBEY 3,044,818

EXTERNAL CARGO SWING FOR AIRCRAFT

Filed May 2, 1961

Harry Tobey
INVENTOR.

July 17, 1962

H. TOBEY 3,044,818

EXTERNAL CARGO SWING FOR AIRCRAFT

Filed May 2, 1961

Harry Tobey
INVENTOR.

July 17, 1962 H. TOBEY 3,044,818
EXTERNAL CARGO SWING FOR AIRCRAFT
Filed May 2, 1961 4 Sheets-Sheet 3
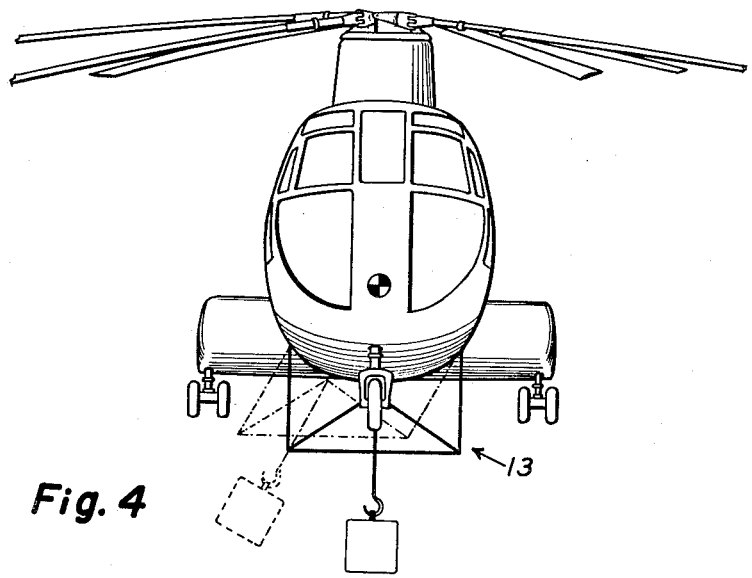
Fig. 4
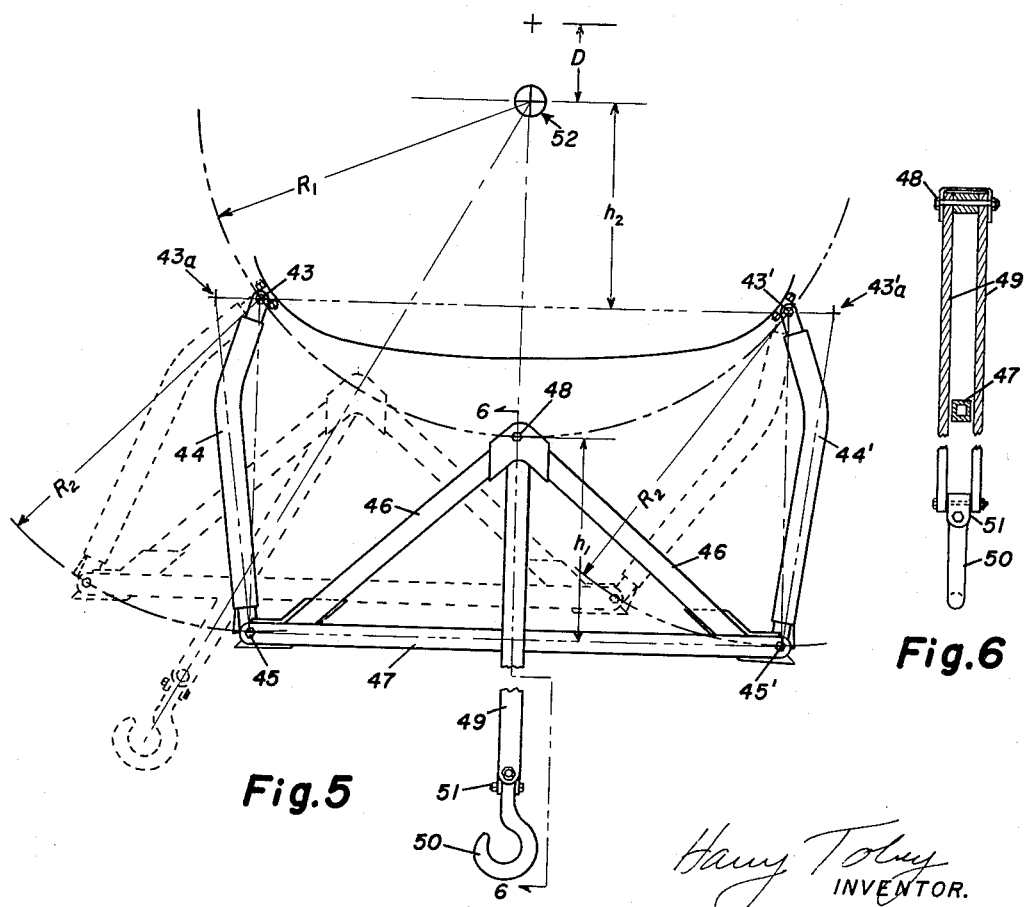
Fig. 5
Fig. 6
Harry Tobey
INVENTOR.

July 17, 1962  H. TOBEY  3,044,818
EXTERNAL CARGO SWING FOR AIRCRAFT
Filed May 2, 1961  4 Sheets-Sheet 4

Harry Tobey
INVENTOR.

United States Patent Office 3,044,818
Patented July 17, 1962

3,044,818
EXTERNAL CARGO SWING FOR AIRCRAFT
Harry Tobey, Havertown, Pa., assignor to Boeing Airplane Company, Seattle, Wash., a corporation of Delaware
Filed May 2, 1961, Ser. No. 107,169
20 Claims. (Cl. 294—81)

This invention relates to aircraft and, more particularly, to apparatus for carrying an external load by an aircraft or other direct lift type aircraft such as helicopters.

The generally known helicopter has a universally mounted rotor system with cyclic pitch control means for tilting the rotor tip path plane to produce a horizontal component of the lift that results in a change in the direction of the lifting force of the rotor system.

A conventional external cargo sling comprising a four-cable spaced truss with a cargo release hook suspended at the apex thereof is generally attached to the underside of the fuselage so that the cargo hook is positioned rigidly in space at a point below the center of gravity of the helicopter. When the point of attachment of an external load to such helicopter is not at the center of gravity and the helicopter is in a flight attitude other than hovering under a no-wind condition, the line of action of the external load force is displaced from the center of gravity and thus produces a moment about the center of gravity tending to change the attitude of the helicopter. To oppose such upsetting moment and to overbalance it when it is desired to change the flight attitude of the helicopter, the direction of the lifting force of the rotor system must be so positioned as to produce the necessary counteracting moment. Generally, the helicopter having a universally mounted rotor system is only capable of producing a relatively small horizontal force component at the rotor hub by directional control of the total lifting force created by the rotor system. This relatively small horizontal force component acting at the rotor hub is usually of insufficient magnitude to position the direction of the total lifting force of the rotor system so as to create about the center of gravity the counteracting moment, which is necessary to oppose the induced rolling moment due to the sway of the external load. For adequate control during external load carrying operations, the directional control of the total lifting force created by the rotor system must be equal to or greater than the induced rolling moment from the sway of the external load or complete loss of control can result. Further, lateral movement of the helicopter control system to tilt the rotor tip path plane in the direction of the swayed load in order to counteract the induced rolling moment about the center of gravity of the helicopter caused by the lateral sway of the load produces a lateral force acting through the rotor system which not only applies the necessary opposing moment about the center of gravity, but also a lateral force acting virtually through the center of gravity in the same direction as the lateral force applied by the sway of the load and the combined effect of these lateral forces acting virtually through the center of gravity results in sideward movement of the helicopter. Thus, a lateral control correction for the rolling moment induced by the swaying load aggravates the lateral movement of the helicopter and, conversely, a control correction for lateral movement of the helicopter would aggravate the rolling moment induced by the swaying load thereby leading to a potentially dangerous instability condition.

The same effect occurs in the longitudinal control response movement to counteract the pitching moment induced by longitudinal sway of the load.

In hover and at relatively low air speed, the external load hangs vertically from the helicopter below the center of gravity and there is relatively little difference in the position of the control stick in hover from that at low air speeds. As the forward air speed increases, however, the aerodynamic drag of the external load causes a progressively larger nose-down pitching moment due to the virtual displacement of the load from a point directly below the center of gravity of the helicopter and creates a large, unstable pitching moment and this condition, in addition to the known dynamic instability of the helicopter at high cruise speed, requires excessive longitudinal control stick motion to maintain control.

Static stability analyses of a helicopter carrying an external load indicate that the line of force of the load at various lateral and longitudinal positions should pass through an area above the center of gravity of the helicopter. But it has been discovered that an increase in dynamic stability is realized when the lines of force pass through an area below the center of gravity.

Pilot flight test reports of a helicopter equipped with the cargo swing of the present invention state that the handling characteristics of the aircraft with an external load suspended from the cargo swing are quite similar to those with an internal cargo.

Previously, at forward air speeds of about 75 miles an hour, using the conventional external cargo sling (described supra) with a load suspended therefrom resulted in lateral roll and longitudinal pitching motion of the aircraft and required excessive pilot effort to maintain control. Also, the helicopter was limited to approximately 20 miles an hour in coordinated turns and in general during normal operations up to 90 percent of the available control was required.

Pilot flight test evaluation of the external cargo swing of the present invention with a load suspended therefrom indicated that there were no adverse effects on the flying qualities of the aircraft at forward speeds up to 95 miles an hour. Also, in coordinated turns at airspeeds up to 60 miles an hour, the cargo swing had a decided advantage over the conventional sling in that there were no problems of stability or availability of control.

Accordingly, it is an object of the present invention to virtually eliminate the control problems associated with carrying cargo slung externally below helicopters by means of a cargo swing device.

It is a further object to provide an external cargo swing means attached to the underside of a helicopter, which swing means functions to maintain the line of action of the external force at a predetermined point or within a predetermined range near the center of gravity of the helicopter during external load carrying operations, in order that adequate control is available throughout normal flight attitudes.

It is a further object of the invention to provide a retractable external cargo sling with indicators in the cockpit of the aircraft for showing the extended and retracted positions of the sling.

A still further object is to provide an external sling particularly suitable for towing objects by aircraft as disclosed in U.S. Patent Number 2,952,421.

Further objects of the invention, as well as advantages thereof, will become apparent from the following description taken in conjunction with the accompanying drawings in which:

FIG. 4 is a front perspective view of the helicopter shown in FIG. 1, schematically depicting the external cargo swing in two positions;

FIG. 5 is an enlarged front view of a modified external cargo swing showing kinematically the method for predetermining the point or range of the line of action of the external load;

FIG. 6 is a partial cross-sectional view of FIGURE 5 taken along the line 6—6;

Figure 1:
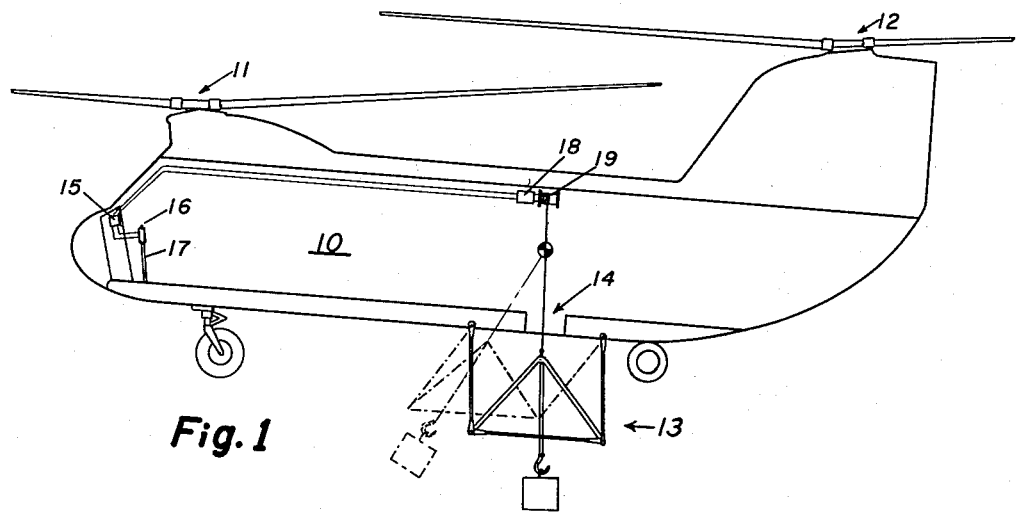
FIG. 1 is a side view of the external cargo swing installation suspended from the underside of the fuselage of a tandem rotor helicopter.

The helicopter, as shown in FIG. 1, comprises a fuselage 10, two rotors 11 and 12, which are interconnected with shafting and driven by a motor (not shown), and various other parts that need not be described in detail to fully understand the description or operation of an external cargo swing assembly 13, which is attached to the underside of the helicopter's fuselage.

The retractable external cargo swing assembly 13 provides for unrestricted lateral and longitudinal movement of the suspended load when the cargo swing is in the extended position. When it is retracted into a fuselage opening 14 at the underside of the aircraft, ample ground clearance is provided. Also, means are incorporated to eliminate the need for additional personnel within the aircraft to operate the cargo swing extension-retraction system. These means include a pilot console instrument 15, indicating the extended or retracted position of the swing, accompanied by a pilot actuated switch 16 mounted on a control stick 17 for operating a motor 18, which in turn rotatably drives a cable drum 19 to extend and retract the cargo swing assembly 13.

Figure 2:
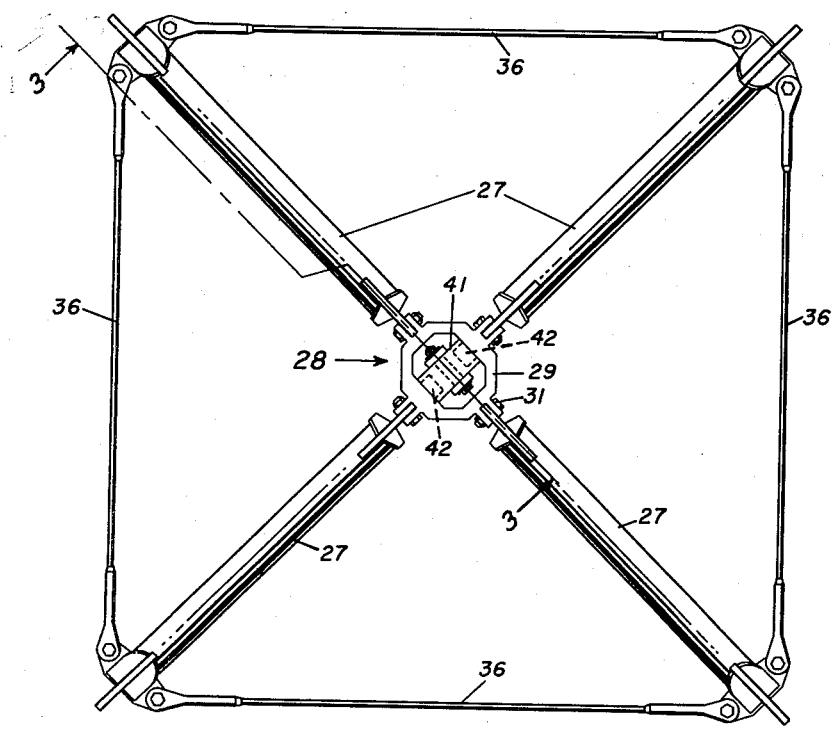
FIG. 2 is a plan view of the external cargo swing showing the truss-type compression leg members of the pyramidal truss structure with cable tension members forming the rectangular base and the universally pivoted hook suspended from the apex of said truss structure.
Figure 3:
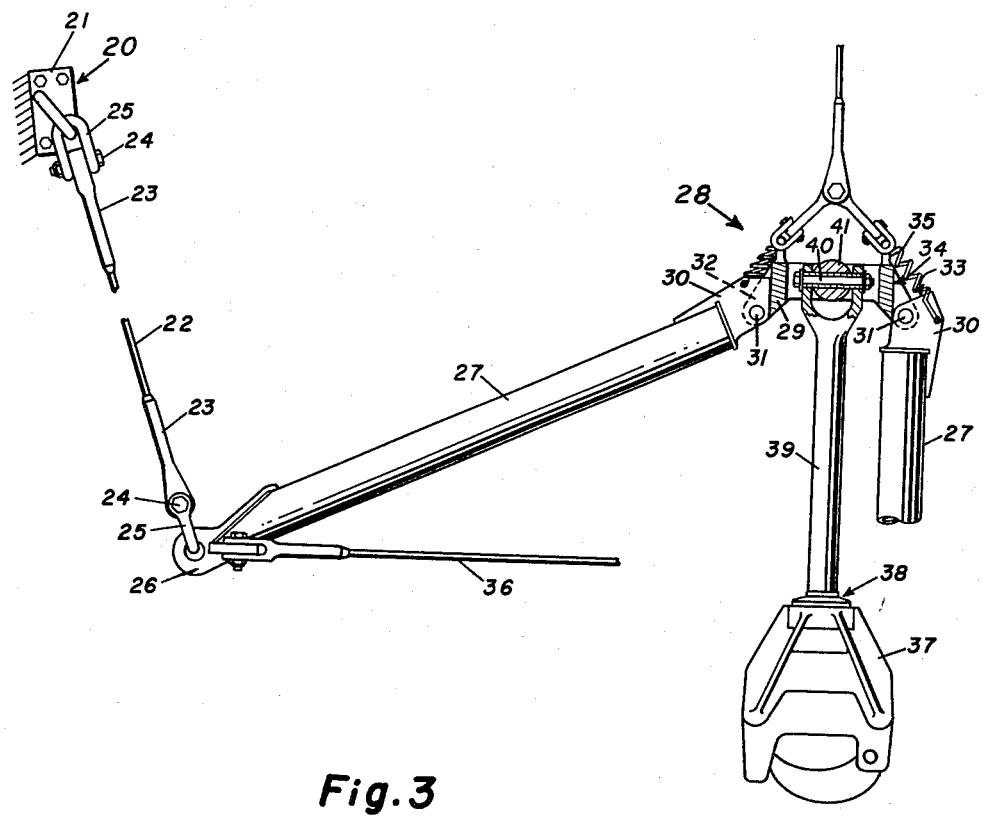
FIG. 3 is a front view of FIGURE 2 showing a partial cross-sectional view of the apex fitting taken along line 3—3 of FIGURE 2.

The cargo swing assembly, as more clearly shown in FIGURES 2 and 3, is attached by means of a shackle joint 20 to a lug fitting 21, fixed to aircraft structure at the underside thereof and suspended a predetermined distance below the fuselage by tension cables 22. Swaged to each end of a tension cable 22 is an eye fitting 23, which in turn is attached by means of a shackle bolt 24 to a shackle or clevis 25. The upper end of each tension cable 22 is pivotally connected by a shackle joint 20 to the aircraft and the lower end similarly connected to a lifting eye 26, fixed to the lower end of a truss-type compression leg member 27 of the pyramidal truss structure.

The pyramidal truss structure comprises an apex assembly 28 having an apex or vertex hub member 29 with the truss-type compression leg members 27 pivotally connected thereto. Each leg member 27 has a lug 30 secured to its upper end and is pivotally attached by a pin 31 to a lug 32, which is integral with the apex hub member 29. A flat surface 33 is provided on the lug 30 for abutment with a surface 34 on the apex member 29 to limit upward movement and rotation about the pivotal pin connection 31 of the leg member 27 relative to the apex hub member 29. Attached to the lug 30 at the upper end of each leg member 27 is one end of a spring 35, which has its opposite end connected to the apex hub member 29 to maintain the flat surfaces 33 and 34 on the lug 30 and the apex hub member 29, respectively, in abutment relation. Therefore, the interconnecting spring means 35 produces some inherent restraint in the cargo swing assembly to hold the inclined leg members 27 of the truss structure apart in order that it does not fold up like an umbrella under low or zero load conditions. Each leg member 27 extends downwardly and outwardly from the apex assembly 28 to form a truss framework to position the apex a predetermined distance above horizontal tension cables 36, which interconnect the lower end of each leg member 27. As shown in the plan view of FIG. 2, the tension cables 36 are of identical length to maintain the tubular truss members 90° apart. It should be noted, however, that for dynamic stability reasons it may be desirable to have the cargo load force vector pass through one virtual pivot point or range for lateral sway of the external load and another for longitudinal sway. Therefore, the interconnecting tension cables 36 may not be of equal length or maintain the tubular truss members 90° apart. Further, it may be desirable to eliminate the interconnecting tension cables 36, and this can be accomplished by stress designing the inclined tubular members 27 as beam structural members and limiting their upward movement and rotation about pivotal pin connection 31 by abutment stop means as shown.

A remotely controlled cargo release hook 37 is journalled at 38 in bearings (not shown) for rotation about the lower end of a vertical member 39, which in turn is pivotally attached at its upper end by pin means 40 to a pin support fitting 41, which in turn is pivotally attached by means of pins or trunnions 42 fixed to the inner section of apex hub member 29. The gimbaled joint so formed permits the cargo hook to swing in any direction and in any desired amount within the mechanical limits of the joint. For cargo release during normal load carrying operations or to jettison the load in the event that the aircraft should become disabled during flight, an electrically actuated release hook controlled by a switch (not shown) positioned on the pilot's control stick could be provided.

The cargo swing assembly 13 is generally positioned relative to the center of gravity of the helicopter both longitudinally, as shown in FIG. 1, and laterally, as shown in FIG. 4, in order that the cargo hook is vertically aligned with the empty weight center of gravity of the helicopter when it is in hovering attitude. The pivotal suspension of the cargo swing assembly 13 from the underside of the fuselage permits lateral and longitudinal movement thereof and further, by the proper design of the sling geometry, through parallelogram action of the linkage members, as described kinematically in conjunction with FIG. 5, the line of force exerted by the swaying load with respect to the fuselage of the helicopter can be made to pass through a predetermined point within the fuselage and such predetermined point can be positioned to coincide with the location of the center of gravity of the helicopter. By so positioning the virtual pivot point, coupling is reduced between lateral motion of the cargo and rolling motion of the helicopter and also between longitudinal motion of the cargo and pitching motion of the helicopter.

The modified cargo swing assembly, as shown in FIGURES 5 and 6, functions in accordance with the invention in one plane and is positioned longitudinally of the helicopter so that the cargo hook is below the empty weight center of gravity of the aircraft. The cargo swing is pivotally connected to the underside of the fuselage by universal joint fittings 43 and 43' and suspended therefrom by curved arm members 44 and 44', which in turn are pivotally connected at their lower ends by pins 45 and 45' to a triangular truss member comprising compression side members 46 and a tension base member 47. Pivotally connected to the apex of the triangular truss member by a pin 48 is a vertically suspended member 49 having a cargo hook 50 attached to the lower end thereof through a universal joint 51. This modified cargo swing assembly functions to position the projection of the load force vector to pass through the predetermined point 52 or range when the load sways laterally but will introduce a pitching moment when it sways longitudinally. Therefore, the structure, as shown, is adaptable more to an aircraft having a strong longitudinal control moment such as a tandem helicopter with a differential collective pitch control system between the fore and aft rotor systems.

Kinematically as shown in FIG. 5, an arc of a circle, drawn from the desired predetermined virtual pivot point 52 with a radius $R_1$, intersects the pivotal axes of universal joint fittings 43 and 43' and also the pivotal axis 48 in the apex assembly from which the vertical member 49 is suspended. Another arc of a circle, drawn from each of said pivotal axes 43 and 43' as its center with a radius $R_2$ equal to $R_1$, intersects the pivotal axis of joint fittings 45 and 45'. A straight line drawn through and interconnecting pivotal axis 43 with that of 45 is in parallel relationship with a similar line drawn through pivotal axis 43' and 45', and in effect, form the sides of a parallelogram. A straight line drawn through and interconnecting pivotal axes 45 and 45' forms the base and a similar line drawn through pivotal axes 43, and 43' fixed to aircraft structure, forms the top of the parallelogram.

The parallelogram construction of the cargo swing, in addition to the positioning of the vertex or apex 48 and the pivotal axes 43 and 43' on the arc of a circle having its center at the desired virtual pivot point 52, causes the line of force exerted by the swaying load, as shown in the relative position of the linkage in dotted lines, to pass through the predetermined point 52, which can be positioned to coincide with the location of the center of gravity. Various modifications and departures from this basic construction can be made in order to adapt the cargo swing to existing aircraft configurations or to produce certain desirable characteristics, e.g., an increase in $h_1$ (i.e., the perpendicular distance of the apex 48 above a straight line drawn through the pivotal axes 45—45') results in a corresponding equal increase in $h_2$ (i.e., the perpendicular distance of the virtual pivot point above a straight line drawn through the pivotal axes 43—43') and, conversely, a decrease in $h_1$ results in an equal decrease in $h_2$.

Where it is desirable to have the virtual pivot point 52 move within a predetermined range as the load sways or where the primary consideration is the size or space limitation of the cargo swing and the moment about the center of gravity of the aircraft caused by the line of force of the external load varying in a range near the center of gravity is secondary, then movement of the pivotal attachment points 43 and 43' horizontally outwardly an equal distance to the position 43a and 43'a, respectively, results in the displacement of the virtual pivot axis a distance D upwardly and, conversely, inward movement of 43 and 43' results in downward displacement of the virtual pivot axis. The rate and range of displacement of the virtual pivot axis relative to the outward or inward movement of the pivotal attachment points 43 and 43' can be determined by a kinematic analysis of the preferred cargo sling linkage arrangement. The final design of a cargo sling should be compatible with the normal maneuverability operations of the aircraft and generally permit a minimum of 30° angular displacement of the cargo load force vector from the vertical position. Further factors to be considered are; the position of the attachment points of the cargo sling to the underside of the aircraft based on aircraft structural load limitation, the operating clearance below the aircraft, the permissible range of center of gravity travel of the aircraft, etc.

The foldable cargo swing, shown in FIGURES 2 and 3, may have disadvantages in that there is a greater structural instability under sudden gust loads encountered by the rotor system of the helicopter where a possible upward force may be applied at the apex hub member 29, and without radial components to hold the inclined leg members of the truss structure apart, there is little inherent restraint to keep the cargo sling frame from folding up like an umbrella. Therefore, it may be desirable to consider the rigid frame systems shown in FIGURES 7 and 8.

Figure 7:
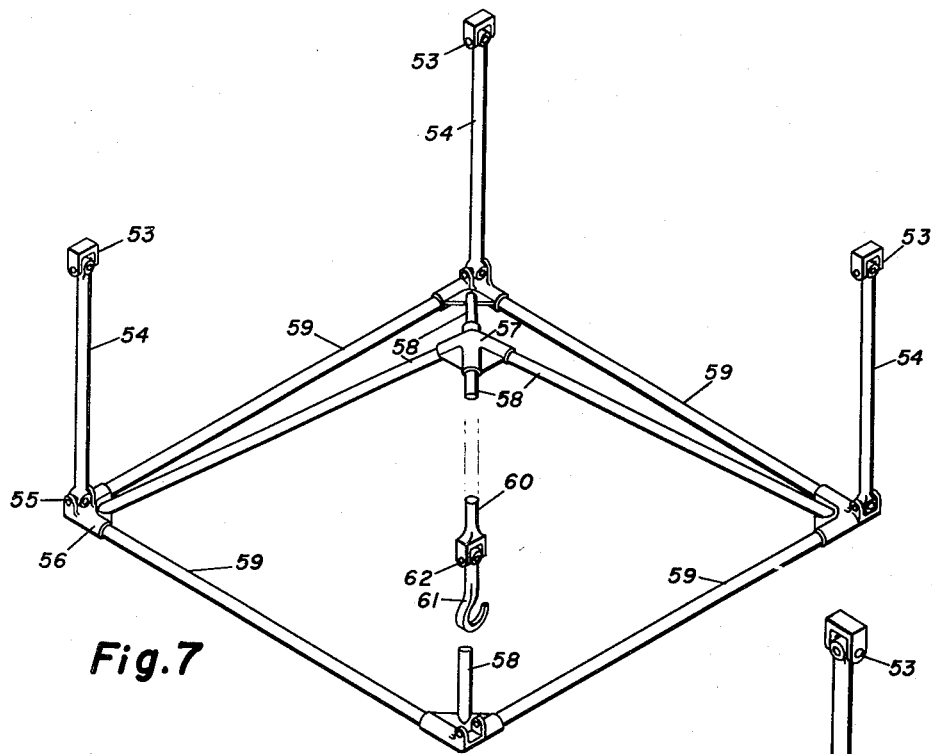
FIG. 7 is an isometric view of a modified external cargo swing showing a rigid pyramidal truss structure with a rectangular base and a hook suspended from the apex of said truss structure.
Figure 8:
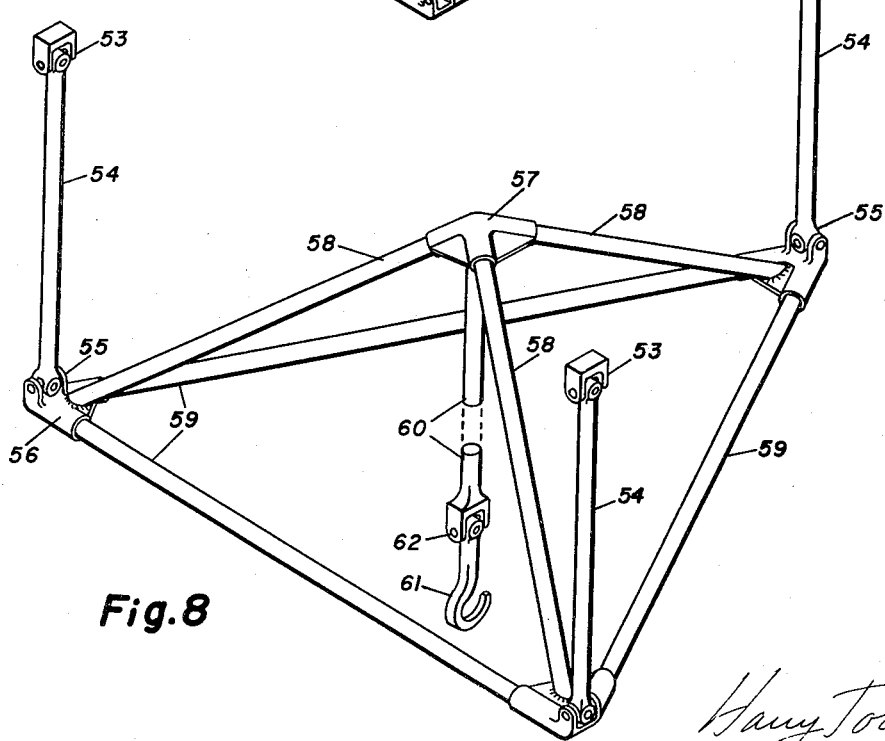
FIG. 8 is an isometric view of a modified external cargo swing showing a rigid pyramidal truss structure with a triangular base and hook suspended from the apex of said truss structure.

Referring now to FIGURES 7 and 8, there is shown a modified external cargo swing comprising rigid structural members, compression leg members not subject to bending, and pivotal connecting means to permit the cargo swing assembly to move freely laterally and longitudinally of the aircraft.

The cargo swing assembly is attached to the underside of the fuselage by universal joint fittings 53 and suspended a predetermined distance below the fuselage by vertical links 54. The lower ends of the vertical links 54 are connected by universal joints 55 to the corner fittings 56 of the rectangular base shown in FIGURE 7 or the triangular base shown in FIGURE 8 of the pyramidal truss structure. The pyramidal truss structure comprises an apex fitting 57 with inclined leg members 58 extending downwardly and outwardly therefrom for positioning the apex a predetermined distance above the horizontal members 59, which are interconnected to the lower end of each leg member 54 through the corner fittings 56 and form the rectangular base shown in FIGURE 7 or the triangular base shown in FIGURE 8. The inclined leg members 58 intersect the corners of the base and are rigidly attached to the corner fittings 56. Pivotally suspended for universal movement from the apex 57 of the pyramidal truss is a vertical member 60 having a cargo hook 61 universally connected to its lower end at 62.

When a load is attached to the cargo hook 61, the forces in the cargo swing are such that the inclined truss members 58 are in compression and the horizontal members 59, interconnecting the lower end of each leg member, are under tension.

Although shown and described in what is believed to be the most practical and preferred embodiments, it is apparent that departures therefrom will suggest themselves to those skilled in the art and may be made without departing from the spirit and scope of the invention.

I therefore do not wish to restrict myself to the particular forms of construction illustrated and described, but desire to avail myself of all modifications that may fall within the scope of the appended claims.

Having thus described my invention, what I claim is:

1. Means for handling external loads by a single aircraft comprising a relatively oscillatable load-supporting structure having upwardly extending truss members interconnected at an apex located in the direction of their upward extensions, a load-supporting member pivotally suspended from said apex, means attached to said member for connection to a load, and means for suspending said load-supporting structure from the lower part of said aircraft.

2. The invention of claim 1 further characterized by lift means attached to said apex and to said aircraft for retracting said structure into said aircraft.

3. Means for handling external loads by a single aircraft comprising a relatively oscillatable triangular load-supporting structure having upwardly extending truss members interconnected at an apex located in the direction of their upward extensions, a load-supporting member pivotally suspended from said apex, means attached to said member for connection to a load, and means for suspending said load-supporting structure from the lower part of said aircraft.

4. Means for handling external loads by a single aircraft comprising a relatively oscillatable pyramidal load-supporting structure having upwardly extending truss members interconnected at an apex located in the direction of their upward extensions, a load-supporting member pivotally suspended from said apex, means attached to said member for connection to a load, and means for suspending said load-supporting structure from the lower part of said aircraft.

5. A means for handling external loads by an aircraft as set forth in claim 1, in which the suspending means for said structure comprises vertically suspended members pivotally connected at their upper ends to the lower part of said aircraft and further including transverse members pivotally interconnecting the lower ends of said upwardly extending truss members.

6. Means for handling external loads by a rotary winged aircraft comprising a relatively oscillatable vertical triangular truss structure having a load support fitting connected to the apex thereof, a pair of vertically suspended members pivotally connected at their upper ends to the lower part of said aircraft at points spaced laterally from a vertical line passing through the center of gravity thereof to position said apex fitting below the center of gravity of said aircraft when in hovering attitude, a generally transverse member pivotally interconnected to the lower end of said vertically suspended members for forming the base of said truss structure, said truss structure having a load supporting member pivotally connected at its upper end to said apex fitting and at its lower end to means for connection to a load.

7. Means for handling external loads by a rotary winged aircraft comprising a relatively oscillatable pyramidal truss structure having a load support fitting connected to the apex thereof, vertically suspended members pivotally connected at their upper ends to the lower part of said aircraft at points spaced laterally and longitudinally from a vertical line passing through the center of gravity thereof to position said apex fitting below the center of gravity of said aircraft when in hovering attitude, generally transverse members pivotally interconnected to the lower ends of said vertically suspended members for forming the base of said truss structure, said truss structure having a load supporting member universally connected at its upper end to said apex fitting and at its lower end to means for connection to a load.

8. A means for handling external loads by an aircraft as set forth in claim 7 in which said vertically suspended members are operative to permit swinging movement of a load attached to said supporting member around a virtual center of suspension below the center of gravity of said aircraft.

9. Means for handling external loads by a rotary winged aircraft comprising in combination, a pair of vertically suspended members pivotally connected at their upper ends to the underside of said aircraft at points spaced laterally from a vertical line passing through the center of gravity of said aircraft, a transverse member pivotally connected at its ends to the lower ends of said vertically suspended members and forming the base of a triangular truss structure, said truss structure having an apex fitting disposed above the base, said apex fitting being positioned in vertical alignment with and below the center of gravity of said aircraft when in hovering attitude, a vertically suspended member pivotally connected at its upper end to said apex fitting, and means attached at the lower end of said vertically suspended member for connection to a load.

10. Means for handling an external load by an aircraft, a load supporting structure pivotally suspended from the lower part of said aircraft for lateral movement and provided with at least two extending members pivotally connected at their upper ends to the lower part of said aircraft at points spaced from a vertical line passing through the center of gravity of said aircraft, a transverse member pivotally connected at its ends to the lower end of each of said extending members for forming the base of a truss structure, said truss structure having an apex fitting disposed above the base and a vertically suspended member pivotally connected at its upper end to said apex fitting, and means attached to the lower end of said vertically suspended member for connection to a load.

11. In means for handling an external load by an aircraft, a load supporting structure pivotally suspended from the lower part of said aircraft for universal movement and provided with at least three extending members pivotally connected at their upper ends to the lower part of said aircraft at points spaced laterally and longitudinally from a vertical line passing through the center of gravity of said aircraft, generally transverse members pivotally connected at their ends to the lower end of each of said extending members for forming the base of a pyramidal truss structure, said truss structure having an apex fitting disposed above the base and a vertically suspended member pivotally connected at its upper end to said apex fitting, and means attached to the lower end of said vertically suspended member for connection to a load.

12. In means for handling an external load by a single rotary winged aircraft comprising in combination with a fuselage, a load supporting truss structure therefor, a load supporting member pivotally connected to the apex of said truss, means for suspending said truss from the underside of said fuselage and for swinging movement relative thereto without effecting any substantial moment about the center of gravity of said aircraft, said suspending means being operative to permit a load attached to said load supporting member to move in a curvilinear plane such that lines of force of said load substantially intersects a vertical line passing through the center of gravity of said aircraft in an area directly below the said center of gravity.

13. A means for handling external loads by an aircraft as set forth in claim 2 in which the suspending means for said structure comprises vertically suspended members pivotally connected at their upper ends to the lower part of said aircraft and further including transverse members pivotally interconnecting the lower ends of said upwardly extending truss members.

14. A means for handling external loads by an aircraft as set forth in claim 3 in which the suspending means for said structure comprises vertically suspended members pivotally connected at their upper ends to the lower part of said aircraft and further including a transverse member pivotally interconnecting the lower ends of said upwardly extending truss members.

15. A means for handling external loads by an aircraft as set forth in claim 4 in which the suspending means for said structure comprises vertically suspended members pivotally connected at their upper ends to the lower part of said aircraft and further including transverse members pivotally interconnecting the lower ends of said upwardly extending truss members.

16. A means for handling external loads by an aircraft as set forth in claim 1 in which the suspending means for said structure comprises vertically suspended members pivotally connected at their upper ends to the lower part of said aircraft.

17. A means for handling external loads by an aircraft as set forth in claim 2 in which the suspending means for said structure comprises vertically suspended members pivotally connected at their upper ends to the lower part of said aircraft.

18. A means for handling external loads by an aircraft as set forth in claim 3 in which the suspending means for said structure comprises vertically suspended members pivotally connected at their upper ends to the lower part of said aircraft.

19. A means for handling external loads by an aircraft as set forth in claim 4 in which the suspending means for said structure comprises vertically suspended members pivotally connected at their upper ends to the lower part of said aircraft.

20. Means for handling external loads by a rotary winged aircraft comprising a relatively oscillatable truss structure having a load support fitting connected to the apex thereof, vertically suspended members pivotally connected at their upper ends to the lower part of said aircraft at points spaced from a vertical line passing through the center of gravity thereof to position said apex fitting below the center of gravity of said aircraft when in hovering attitude, and at least one generally transverse member pivotally interconnected to the lower ends of said vertically suspended members for forming the base of said truss structure, said truss structure having a load supporting member pivotally connected at its upper end to said apex fitting and at its lower end to means for connection to a load.

References Cited in the file of this patent

UNITED STATES PATENTS

| | | |
|---|---|---|
| 1,825,329 | Adams | Sept. 29, 1931 |
| 2,721,044 | Young | Oct. 18, 1955 |
| 2,953,330 | Lysak | Sept. 20, 1960 |